No. 746,553.

Patented December 8, 1903.

UNITED STATES PATENT OFFICE.

GEORGE H. MOORE, OF NORWICH, CONNECTICUT.

COMPOSITION MATERIAL.

SPECIFICATION forming part of Letters Patent No. 746,553, dated December 8, 1903.

Application filed August 20, 1903. Serial No. 170,120. (No specimens.)

*To all whom it may concern:*

Be it known that I, GEORGE H. MOORE, a citizen of the United States, residing at Norwich, in the county of New London and State of Connecticut, have invented certain new and useful Improvements in Composition Material, of which the following is a specification.

My invention relates to the production of a composition material in which granulated, pulverized, or ground cork forms the characteristic ingredient and which material may be used for all purposes for which natural cork is used—for bottle-seals, filler-stock for boots and shoes, friction-surfaces for rolls in silk-mills, for pulley-faces, &c.

My invention embodies the composition and method of preparing the same for obtaining a material of the character above described. Broadly stated, my invention consists in incorporating with a suitable quantity of granulated or comminuted cork an adhesive substance or binder for cementing the particles of cork together into a fabric or sheet, with the addition of a substance having the property of overcoming or modifying the natural rigidity or stiffness of the adhesive substance or binder used when the same has become "set." By this means articles made according to my process possess when in a finished condition a high degree of elasticity, flexibility, and resiliency.

My invention further relates to combining a fibrous material with granulated or comminuted cork, which fibrous material possesses the property of taking up and attaching to itself the particles of cork, thereby forming a bond between the particles, and thus increasing the tensile strength of the fabric or material made therefrom when in its finished condition.

In order to enable those skilled in the art to carry out my invention, I give the following detailed description: I take three ounces of granulated or comminuted cork and mix therewith one and one-half ounces of starch in twelve ounces of water. To the starch and water is added two ounces of a saponaceous solution formed, preferably, of three-fourths of a pound of castile soap dissolved in one gallon of water. The liquid ingredients are added to the cork and the cork is thoroughly mixed therewith, so as to coat each particle of the cork. The mixing may be accomplished in any desired manner, as by means of any suitable or convenient mixing machinery or by hand. When the ingredients are thoroughly incorporated, the mass is rolled out into sheets of any desired thickness by means of rolls or may be molded into any desired form or pressed into sheets by any suitable means. When the sheets are formed, they are set away to dry, or the drying may be accomplished by passing the same over drying-rollers.

Where the material is desired to have a greater tenacity and increased tensile strength, I incorporate with the cork before mixing with the liquid ingredients about one ounce of asbestos fiber to three ounces of the cork. The asbestos fiber has the property of taking up and adhering to a considerable quantity of the cork particles, the fibers of the asbestos adhering and attaching themselves to the cork particles. A uniform mixture is prepared of the cork and asbestos by passing both through picker-rolls to evenly distribute the asbestos, so that the mixture may be made uniform. When the asbestos fibers and cork are thoroughly incorporated, the starch and water and the saponaceous solution are mixed therewith and the mass is treated as above described.

The proportions given above will make about one and one-half square feet of fabric one-eighth of an inch thick.

It will be understood that equivalents of the several ingredients may be employed without departing from the spirit and scope of the invention. For instance, instead of the asbestos fiber any mineral fiber or fiber not acted upon by acids or liquids generally may be used—such, for instance, as mineral wool or slag wool, &c.; also, that any desired saponaceous solution may be employed instead of that made by the use of castile soap. For the adhesive material or binder any farinaceous agglutinant may be used in place of starch.

It will be understood that the proportions given need not be strictly followed in order to carry out my invention, but that they may be modified to suit the character of product desired.

The material obtained by practicing my invention possesses a high degree of resiliency and elasticity and is eminently suited for the purposes described.

Having thus described my invention, the following is what I claim as new therein and desire to secure by Letters Patent:

1. The process of producing a material of the character described, which consists in combining a saponaceous solution with an agglutinant and mixing cork particles with the agglutinant so treated.

2. The process of producing a material of the character described, which consists in combining a saponaceous solution with a farinaceous agglutinant and mixing cork particles with the agglutinant so treated.

3. The process of producing a material of the character described, which consists in combining a saponaceous solution with starch and water and mixing cork particles with the agglutinant so treated.

4. The process of producing a material of the character described, which consists in incorporating cork particles with a fibrous mineral material, mixing said mixture with an agglutinant having a saponaceous solution combined therewith.

5. The process of producing a material of the character described, which consists in combining a solution of soap with an agglutinant and mixing cork particles with the agglutinant so treated.

6. The process of producing a material of the character described, which consists in combining a solution of soap with a farinaceous agglutinant and mixing cork particles with the agglutinant so treated.

7. The herein-described composition of matter, comprising cork particles, a farinaceous agglutinant and a saponaceous material.

8. The herein-described composition of matter, comprising cork particles, starch, water and a saponaceous material.

9. The herein-described composition of matter, comprising cork particles, a farinaceous agglutinant and soap.

10. The herein-described composition of matter, comprising cork particles, starch and a solution of soap.

11. The herein-described composition of matter, comprising cork particles, mineral fiber, starch, water and a saponaceous material.

12. The herein-described composition of matter, comprising cork particles, mineral fiber, starch, water and a solution of soap.

GEORGE H. MOORE.

Witnesses:
LUCIUS BROWN,
RUTH A. SOVELL.